(12) United States Patent
Maziers

(10) Patent No.: US 9,987,810 B2
(45) Date of Patent: *Jun. 5, 2018

(54) PROCESS FOR PRODUCING MONO-ROTOMOULDED ARTICLES PREPARED FROM BLENDS COMPRISING POLYETHYLENE

(71) Applicant: TOTAL RESEARCH & TECHNOLOGY FELUY, Seneffe (Feluy) (BE)

(72) Inventor: Eric Maziers, Seneffe (BE)

(73) Assignee: TOTAL RESEARCH & TECHNOLOGY FELUY, Seneffe (Feluy) (BE)

(*) Notice: Subject to any disclaimer, the term of this patent is extended or adjusted under 35 U.S.C. 154(b) by 947 days.

This patent is subject to a terminal disclaimer.

(21) Appl. No.: 14/188,153

(22) Filed: Feb. 24, 2014

(65) Prior Publication Data

US 2014/0170356 A1 Jun. 19, 2014

Related U.S. Application Data

(63) Continuation of application No. 11/920,083, filed as application No. PCT/EP2006/062154 on May 9, 2006, now Pat. No. 8,715,796.

(30) Foreign Application Priority Data

May 9, 2005 (EP) ..................................... 05103801

(51) Int. Cl.
*B29C 41/04* (2006.01)
*B29D 22/00* (2006.01)
(Continued)

(52) U.S. Cl.
CPC ............ *B29D 22/003* (2013.01); *B29C 41/04* (2013.01); *B29D 22/00* (2013.01); *C08L 23/06* (2013.01); *C08L 67/02* (2013.01); *C08L 67/025* (2013.01); *C08L 69/00* (2013.01); *B29K 2023/06* (2013.01); *B29K 2023/083* (2013.01); *B29K 2023/086* (2013.01); *B29K 2067/00* (2013.01); *B29K 2105/0088* (2013.01); *C08L 23/0876* (2013.01);
(Continued)

(58) Field of Classification Search
CPC ....................................................... B29C 41/04
USPC ................................................... 264/310–312
See application file for complete search history.

(56) References Cited

U.S. PATENT DOCUMENTS 4,533,696 A * 8/1985 Schrijver .............. B29C 41/003
264/45.7
4,678,834 A * 7/1987 Boivin ...................... C08J 3/226
523/205
(Continued)

FOREIGN PATENT DOCUMENTS

EP 1357135 A1 * 10/2003 .............. C08F 10/02
JP 2005007837 A * 1/2005

OTHER PUBLICATIONS

English abstract of JP2005007837.*

*Primary Examiner* — Christina Johnson
*Assistant Examiner* — Xue Liu
(74) *Attorney, Agent, or Firm* — Albert Shung

(57) ABSTRACT

The present invention discloses a single layer rotomolded article prepared from a blend of polyethylene, functionalized polyolefin and one or more resins selected from polyetherester or saturated polyester or polycarbonate or polyamide.

15 Claims, 3 Drawing Sheets

(51) Int. Cl.
    *C08L 23/06*     (2006.01)
    *C08L 67/02*     (2006.01)
    *C08L 69/00*     (2006.01)
    *B29K 23/00*     (2006.01)
    *B29K 67/00*     (2006.01)
    *B29K 105/00*     (2006.01)
    *C08L 23/08*     (2006.01)
    *C08L 27/12*     (2006.01)
    *C08L 51/06*     (2006.01)
    *C08L 75/04*     (2006.01)
    *C08L 77/12*     (2006.01)

(52) U.S. Cl.
    CPC ............... *C08L 27/12* (2013.01); *C08L 51/06* (2013.01); *C08L 75/04* (2013.01); *C08L 77/12* (2013.01); *C08L 2314/06* (2013.01); *Y10T 428/1352* (2015.01); *Y10T 428/1397* (2015.01)

(56) References Cited

U.S. PATENT DOCUMENTS

| | | | |
|---|---|---|---|
| 6,214,272 B1 * | 4/2001 | Gruenwald | B29C 41/04 264/255 |
| 8,961,856 B2 * | 2/2015 | Maziers | C08L 23/02 264/310 |
| 2002/0077401 A1 * | 6/2002 | Chaudhary | B29C 41/003 524/394 |
| 2003/0149180 A1 * | 8/2003 | Van Dun | C08F 10/02 525/240 |
| 2004/0254332 A1 * | 12/2004 | Hayes | B32B 27/36 528/296 |
| 2005/0017409 A1 * | 1/2005 | Weber | B29C 41/003 264/310 |
| 2005/0101722 A1 * | 5/2005 | Briers | C08L 23/04 524/520 |

* cited by examiner

100 μm

100 μm

PROCESS FOR PRODUCING MONO-ROTOMOULDED ARTICLES PREPARED FROM BLENDS COMPRISING POLYETHYLENE

CROSS-REFERENCE TO RELATED APPLICATIONS

This application is a Continuation of Ser. No. 11/920,083, filed on Feb. 3, 2009, which claims the benefit of PCT/EP2006/062154, filed on May 9, 2006, which claims priority from EP 05103801.6, filed on May 9, 2005.

The present invention is related to the field of mono-layer rotomoulded articles prepared from a blend comprising polyethylene mixed one or more other component selected from polyetherester or saturated polyester or polycarbonate or polyamide.

Polyethylene represents more than 80% of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerization of these polymer alloys requires a complex catalyst system comprising organometallic catalyst precursors, cationic forming cocatalysts and cross-over agents.

It is thus desired to produce mono-layer rotomoulded articles prepared with blends comprising polyethylene and one or more other resins of similar or dissimilar material in order to improve the final properties of the finished product. For example, it may be desirable to combine the good shock absorber and impact properties of polyetherester with the acceptable food contact and qualities of polyethylene, such as for example low cost and good impact at low temperature.

It is an aim of the present invention to prepare rotomoulded articles having good barrier resistance.

It is a further aim of the present invention to prepare rotomoulded articles having a good shock absorbing properties.

It is yet another aim of the present invention to prepare rotomoulded articles upon which it is easy to glue additional parts.

It is also an aim of the present invention to prepare rotomoulded articles that have a soft touch.

It is yet a further aim of the present invention to prepare articles having either good hydrophobic or hydrophilic properties.

Accordingly, the present invention discloses a mono-layer article prepared by rotational moulding from a blend that comprises:
a. from 10 to 99.9 wt %, preferably from 50 to 99.9 wt % of polyethylene (PE);
b. from 0.1 to 90 wt %, preferably from 0.1 to 50 wt % of one or more resins selected from polyetherester or saturated polyester or polycarbonate or polyamide or ethylene-vinyl-acetate (EVA); and
c. from 0 to 20 wt % of functionalised polyolefin.

In a more preferred embodiment according to the present invention, the blend comprises at least 75 wt % of metallocene-produced polyethylene.

Preferably, the functionalised polyolefin is a functionalised polyethylene, selected from grafted polyethylene or ionomer or a combination thereof and it is present in an amount of from 0.5 to 20 wt %.

The blends are provided as standard pellets prepared by coextruding the polyethylene resin, the one or more other resins selected from polyetherester or saturated polyester or polycarbonate or polyamide and the functionalised polyolefin. The standard pellets can further be ground into powder or micropellets.

The articles may contain any number of additional conventional layers.

Preferably, polyethylene (PE) is prepared with a Ziegler-Natta or a metallocene-based catalyst system or a combination thereof.

The polyetherester, saturated polyester, polycarbonate or polyamide used in the present invention may comprise minor components selected from the group consisting of polyether-block co-polyamide, thermoplastic polyurethane and fluoropolymer.

By minor component it is meant that such a component makes up less than 50% by weight.

The polyetheresters are copolymers having polyester blocks and polyether blocks. They typically consist of soft polyether blocks, which are the residues of polyetherdiols, and of hard segments (polyester blocks), which usually result from the reaction of at least one dicarboxylic acid with at least one chain-extending short diol unit. The polyester blocks and the polyether blocks are generally linked by ester linkages resulting from the reaction of the acid functional groups of the acid with the OH functional groups of the polyetherdiol. The short chain-extending diol may be chosen from the group consisting of neopentyl glycol, cyclohexanedimethanol and aliphatic glycols of formula $HO(CH_2)_nOH$ in which n is an integer varying from 2 to 10. Advantageously, the diacids are aromatic dicarboxylic acids having from 8 to 14 carbon atoms. Up to 50 mol % of the dicarboxylic aromatic acid may be replaced with at least one other dicarboxylic aromatic acid having from 8 to 14 carbon atoms, and/or up to 20 mol % may be replaced with a dicarboxylic aliphatic acid having from 2 to 12 carbon atoms.

As examples of dicarboxylic aromatic acids, mention may be made of terephthalic, isophthalic, dibenzoic, naphthalenedicarboxylic acids, 4,4'-diphenylenedicarboxylic acid, bis(p-carboxyphenyl)methane acid, ethylenebis(p-benzoic acid), 1,4-tetramethylenebis(p-oxybenzoic acid), ethylenebis(paraoxybenzoic acid) and 1,3-trimethylene bis(p-oxybenzoic acid). As examples of glycols, mention may be made of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexylenedimethanol. The copolymers having polyester blocks and polyether blocks are, for example, copolymers having polyether blocks derived from polyether diols, such as polyethylene glycol (PEG), polypropylene glycol (PPG) or polytetramethylene glycol (PTMG), dicarboxylic acid units, such as terephthalic acid, and glycol (ethanediol) or 1,4-butanediol units. The chain-linking of the polyethers and diacids forms soft segments while the chain-linking of the glycol or the butanediol with the diacids forms the hard segments of the copolyetherester. Such copolyetheresters are disclosed for example in EP 402 883 and EP 405 227. These polyetheresters are thermoplastic elastomers. They may contain plasticizers.

Polyetheresters can for example be obtained from Du Pont Company under the Hytrel® trademark.

Saturated polyester resins are polycondensation products of dicarboxylic acids with dihydroxy alcohols. They are a special kind of alkyd resin that are usually not modified with fatty acids or drying oils and they have the ability, when catalysed, to cure or harden at room temperature under little or no pressure. The preferred saturated polyesters are polyalkylene terephthalate, more preferably polyethylene terephthalate (PET) and polybutylene terephthalate (PBT).

Saturated polyesters can for example be obtained from Cyclics under the name Cyclics CBT®.

Polycarbonate (PC) is a thermoplastic resin obtained from a dihydroxy compound and a carboxylic acid derivative or a carbonate diester. The preferred polycarbonate is the condensation product of bisphenol A and phosgene.

Polyamide is the condensation product of:
one or more amino acids such as aminocaproic acid, 7-aminoheptanoic acid, 11-aminoundecanoic acid and 12-aminododecanoic acid of one or more lactams such as caprolactam, oenantholactam and lauryllactam; and
one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, mention may be made of PA 6 and PA 6-6.

It is also advantageously possible to use copolyamides. Mention may be made of the copolyamides resulting from the condensation of at least two α,ω-aminocarboxylic acids or of two lactams or of one lactam and one α,ω-aminocarboxylic acid. Mention may also be made of the copolyamides resulting from the condensation of at least one α,ω-aminocarboxylic acid (or a lactam), at least one diamine and at least one dicarboxylic acid.

Advantageously, the copolyamide is chosen from PA 6/12 and PA 6/6-6.

More generally, amine terminated materials can also be used in the blends of the present invention and they are preferably selected from polyamide diamine (PAdiNH$_2$). According to their process of manufacture and/or the chain limiter used, the polyamides may have excesses of acid or amine end groups or may even have a proportion of alkyl or other end groups, for example aryl or any other function, deriving from the structure of the limiter chosen. The excess of acid end groups derives from a diacid chain limiter. The excess of amine end groups derives from a diamine chain limiter. A primary amine chain limiter leads to a polyamide chain having an alkyl end and an amine end.

The polyamides that can be used in the blend of the present invention may also be impact-modified polyamides. Supple modifiers may be made, for example, of functionalised polyolefins, grafted aliphatic polyesters, optionally grafted copolymers containing polyether blocks and polyamide blocks, and copolymers of ethylene and of an alkyl (meth)acrylate and/or of a saturated vinylcarboxylic acid ester. The modifier may also be a polyolefin chain with polyamide grafts or polyamide oligomers thus having affinities with the polyolefins and the polyamides. The supple modifier may also be a block copolymer.

Foamed polyamides may also be used.

The polyamide blend may further advantageously include polyurethane or a composition comprising polyamide and ethylene/vinyl alcohol copolymers (EVOH), and more generally, any composition comprising polyamide and a barrier layer.

Polyether-block co-polyamides are represented by the general formula $$HO-[C(O)-PA-C(O)-O-PEth-O]_n-H \qquad (I)$$

wherein PA represents the polyamide segment and PEth the polyether segment. For example the polyamide segment can be a PA 6, PA 66, PA 11 or a PA 12. The polyether segment can for example be a polyethylene glycol (PEG) or a polypropylene glycol (PPG) or a polytetramethylenglycol (PTMG). The molecular weight $M_n$ of the polyamide sequence is usually between 300 and 15,000. The molecular weight $M_n$ of the polyether sequence is usually between 100 and 6000. Such materials are commercially available for example from Arkema under the Pebax® trade name.

The copolymers having polyamide blocks and polyether blocks are generally obtained from the polycondensation of polyamide blocks having reactive end groups with polyether blocks having reactive end groups, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated am-polyoxyalkylene blocks called polyetherdiols; and
3) polyamide blocks having dicarboxylic chain ends with polyetherdiols, the products obtained being, in this particular case, polyetheresteramides.

The polyamide blocks having dicarboxylic chain ends derive, for example, from the condensation of polyamide precursors in the presence of a chain-stopping carboxylic diacid.

The polyamide blocks having diamine chain ends derive, for example, from the condensation of polyamide precursors in the presence of a chain-stopping diamine.

The polymers having polyamide blocks and polyether blocks may also include randomly distributed units. These polymers may be prepared by the simultaneous reaction of the polyether and of the precursors of the polyamide blocks.

For example, a polyetherdiol, polyamide precursors and a chain-stopping diacid may be made to react together. A polymer is obtained which essentially has polyether blocks and polyamide blocks of very variable length, but in addition the various reactants that have reacted randomly, which are distributed in a random fashion along the polymer chain.

A polyether diamine, polyamide precursors and a chain-stopping diacid may also be made to react together. A polymer is obtained which has essentially polyether blocks and polyamide blocks of very variable length, but also the various reactants that have reacted randomly, which are distributed in a random fashion along the polymer chain.

The amount of polyether blocks in these copolymers having polyamide blocks and polyether blocks is advantageously from 10 to 70% and preferably from 35 to 60% by weight of the copolymer.

The polyetherdiol blocks may either be used as such and copolycondensed with polyamide blocks having carboxylic end groups, or they may be aminated in order to be converted into polyetherdiamines and condensed with polyamide blocks having carboxylic end groups. They may also be blended with polyamide precursors and a diacid chain stopper in order to make the polymers having polyamide blocks and polyether blocks with randomly distributed units.

The number-average molar mass $M_n$ of the polyamide blocks is usually between 300 and 15,000, except in the case of the polyamide blocks of the second type. The mass $M_n$ of the polyether blocks is usually between 100 and 6000.

The polyurethanes, if present, typically consist of soft polyether blocks, which usually are residues of polyetherdiols, and hard blocks (polyurethanes), which may result from the reaction of at least one diisocyanate with at least one short diol. The short chain-extending diol may be chosen from the glycols mentioned above in the description of the polyether esters. The polyurethane blocks and polyether blocks are linked by linkages resulting from the reaction of the isocyanate functional groups with the OH functional groups of the polyether diol.

Thermoplastic polyurethanes can for example be obtained from Elastogran GmbH under the Elastollan® trade name or from Dow Chemical Company under the Pellethane® trade name.

The fluoropolymers suited as processing aid in the present invention are for example polymers of vinylidene fluoride ($H_2C=CF_2$) and/or copolymers of vinylidene fluoride and hexafluoropropylene ($F_2C=CF-CF_3$). Though the copolymers of vinylidene fluoride and hexafluoropropylene do not have elastomeric properties they are commonly referred to as "fluoroelastomers". The content of the comonomer hexafluoropropylene in a fluoroelastomer is usually in the range of 30 to 40% by weight. Fluoropolymers suited as processing aids in the current invention are for example commercially available under the Dynamar®, Viton® and Kynar® trade names from Dyneon, DuPont-Dow Elastomers or Arkema.

Polyethylenes prepared with a Ziegler-Natta or with metallocene catalyst or with late transition metal catalyst systems are typically used in rotomolding applications. Linear low density polyethylene is preferably used as disclosed for example in "Some new results on rotational molding of metallocene polyethylenes" by D. Annechini, E. Takacs and J. Vlachopoulos in ANTEC, vol. 1, 2001.

The preferred polyethylene according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or bis-(n-butyl-cyclopentadienyl) zirconium dichloride or dimethylsilylene-bis(2-methyl-4-phenyl-indenyl) zirconium dichloride. The most preferred metallocene component is ethylene-bis-tetrahydroindenyl zirconium dichloride.

In this description, the term copolymer refers to the polymerisation product of one monomer and one or more comonomers.

The melt index of the polyethylene resin preferably used in the present invention typically falls in the range 0.1 to 25 dg/min, preferably in the range 0.2 to 15 dg/min and most preferably in the range 0.5 to 10 dg/min. The melt flow index MI2 is measured following the method of standard test ASTM D 1283 at a temperature of 190° C. and a load of 2.16 kg.

The homo- and co-polymers of ethylene that can be used in the present invention preferably have a density in the range 0.910 to 0.975 g/ml and more preferably in the range 0.915 to 0.955 g/ml. The density is measured following the method of standard test ASTM D 1505 at 23° C.

The polyethylene of the present invention may also have a bi- or multimodal molecular weight distribution, i.e. they may be a blend of two or more polyolefins with different molecular weight distributions, which can be blended either physically or chemically, i.e. produced sequentially in two or more reactors.

The polydispersity D of the polyoethylene suitable for the present invention is in the range 2 to 20, preferably 2 to 8, more preferably less than or equal to 5, and most preferably less than or equal to 4, the latter range being typically associated with the preferred metallocene-prepared polyethylene resins. The polydispersity index D is defined as the ratio Mw/Mn of the weight average molecular weight Mw over the number average molecular weight Mn.

The polyolefins of the present invention may also comprise other additives such as for example antioxidants, acid scavengers, antistatic additives, fillers, slip additives or anti-blocking additives.

The functionalised polyolefins, if present are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene. Alternatively, the functionalised polyolefin is an ionomer. Grafted polyethylene provides excellent adhesion properties whereas ionomers enhance mechanical properties. In a more preferred embodiment according to the present invention, the functionalised polyolefin is a mixture of ionomer and grafted polyethylene.

The choice of resins to be included blend is tailored in function of the desired final properties such as for example:
- excellent shock absorption;
- excellent impact properties;
- soft touch;
- same good barrier properties as polyamide but at a lesser cost;
- anti-slip when dry and slippery when wet
- broad range of working temperature
- good hardness
- hydrophobic or hydrophilic properties
- scratch resistance.

The wall thickness of the finished articles is determined by the size of the final product, by the desired properties and by the cost: it can vary from 1 mm up to several cm.

The size of the rotomoulded articles varies from 0.1 L up to 70 m$^3$. Because of their excellent impact and shock absorbing properties, the rotomoulded articles prepared according to the present invention can be large, such as drums, bumpers or large containers.

The present invention also discloses a process for preparing mono-layer rotomoulded articles.

Rotomoulded articles can be prepared either by manual introduction of material during the moulding cycle or by the use of a drop-box.

Manual addition involves moving the mould from the oven, removing a vent tube or plug that creates an opening in the part and adding material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

LIST OF FIGURES

EXAMPLES

Several rotomoulded articles were prepared as follows. Different blends were prepared by coextrusion.
They consisted of:
77 wt % of polyethylene produced with a metallocene catalyst system based on ethylene-bis-tetrahydro-indenyl zirconium dichloride and having a melt flow index MI2 of 4 dg/min and a density of 0.940 g/cm$^3$;
3 wt % of grafted polyethylene represented by

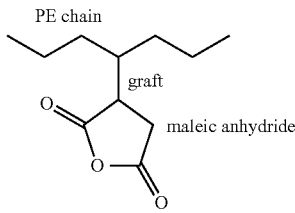

and having a melt flow index MI2 of 25 dg/min and a density of 0.940 g/cm$^3$; and
20 wt % of Pebax® 3533 having hydrophobic properties or of Pebax® MH 1657 having hydrophilic properties.
In another blend, the 3 wt % of grafted polyethylene were replaced by ionomer

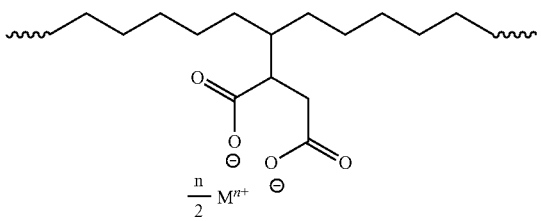

The blends were produced either as micropellets or as powder obtained by grinding standard pellets.

The Pebax® that was used in the blend has a much lower Young's modulus than polyethylene and is a plasticiser.

All test mouldings were carried out on the ROTOSPEED rotational moulding machine. It is a carrousel-style machine with offset arm, LPG burner arm with a burner capacity of 523 kW/hr, air fan cooling, and a maximum plate diameter of 1.5 m.

An aluminum box mould was used to produce the test mouldings. The mould was equipped with a draft angle to facilitate demoulding and the bi-layer articles were prepared by the use of a drop box. The drop box was filled with the material needed for the first layer and then attached to the lid of the mould. A pneumatic ram in the drop box held the material in place until the required temperature was reached, the ram was then activated and the material was dropped in. That operation was repeated for each layer under the conditions described below.

The moulding conditions for the trials were as follows:
oven temperature: 300° C.
peak internal air temperature (PIAT): 200° C.
cooling medium: forced air
preheated arm and mould
cycle time: 20 minutes
wall thickness of rotomoulded parts: 1.5 mm.

Figure 1:
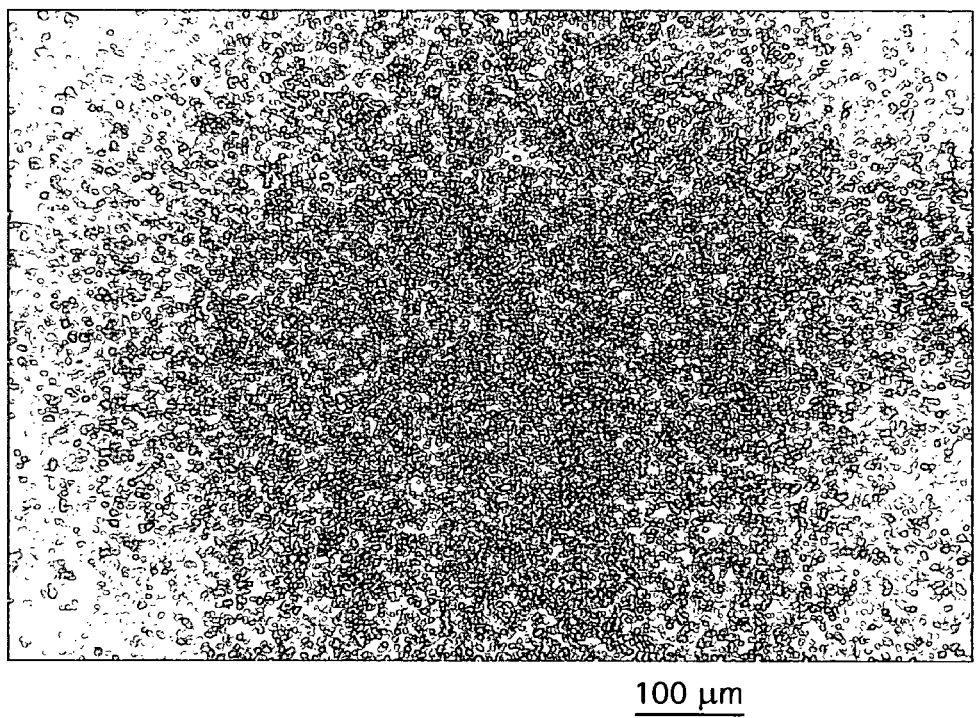
FIG. 1 represents the microstructure of a rotomoulded article prepared from a blend of 77 wt % of polyethylene, 3 wt % of graphted polyethylene and 20 wt % of Pebax® 3533.
Figure 2:
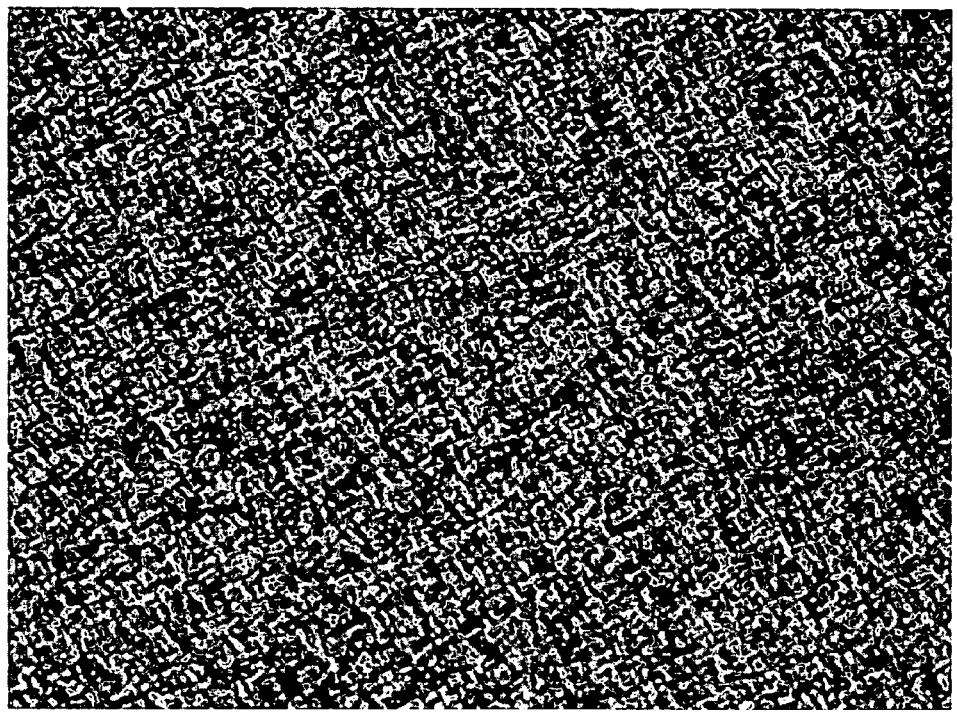
FIG. 2 represents the microstructure of a rotomoulded article prepared from the same polyethylene as that used in the blend of FIG. 1, used alone.

The rotomoulded articles had an excellent homogeneity and the Pebax® was perfectly dispersed into the finished article as can be seen on FIG. 1: this result is quite surprising as Pebax® is known to be difficult to disperse. In addition, as can be seen on the same FIG. 1, the microstructure is very fine, much finer than that of typical polyethylene displayed on FIG. 2. This confers excellent mechanical properties to the finished articles.

Figure 3:
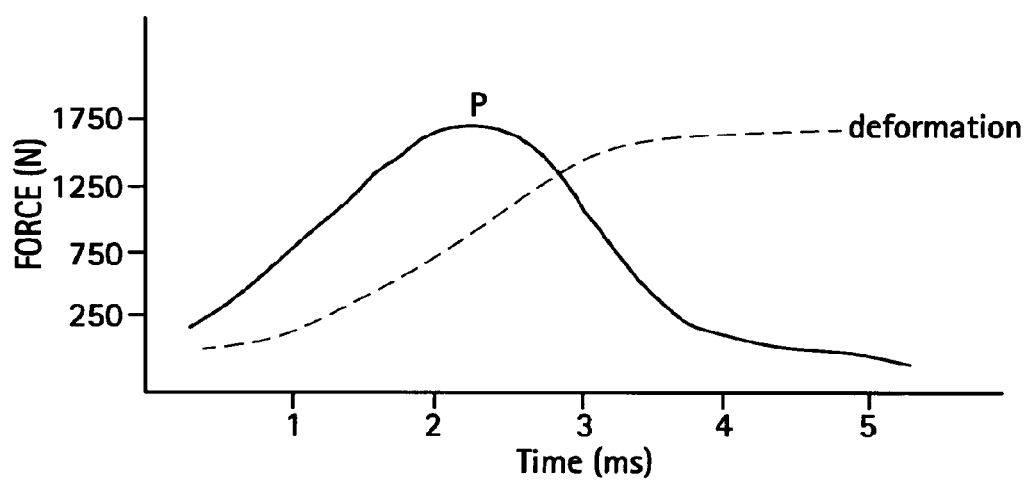
FIG. 3 represents the impact strength expressed in Newtons as a function of time expressed in ms, and where peak energy is marked by P. The deformation of the article as a function of time is also indicated on the graph.

The impact properties of the rotomoulded articles were measured using the method of standard test ISO 6602-3 at a temperature of −40° C. and using a falling mass of 26.024 kg, a speed of the falling mass of 4.43 m/s and an impact energy of 255 J. All tests showed a ductile behaviour as can be seen on FIG. 3.

The invention claimed is:
1. A process for producing a mono-layer rotomoulded article comprising:
rotomoulding a blend of:
from 10 to 99.9 wt % of polyethylene;
from 0.1 to 90 wt % of a polyether-block co-polyamide; and
from 0 to 20 wt % of functionalised polyolefin.
2. The process of claim 1, wherein, prior to rotomoulding the blend, the blend is prepared by coextruding the polyethylene, the polyether-block co-polyamide, and optionally the functionalised polyolefin to obtain the blend in the form of pellets.
3. The process of claim 2, further comprising grinding the pellets into powder or micropellets prior to the rotomoulding.
4. The process of claim 1, wherein the blend is manually introduced during the moulding cycle.
5. The process of claim 1, wherein the blend is placed in a drop-box, and wherein the blend is released into the mould from the drop-box during the moulding cycle.
6. The process of claim 1, wherein the blend comprises:
from 50 to 99.9 wt % of the polyethylene;
from 0.1 to 50 wt % of the polyether-block co-polyamide; and
from 0.5 to 20 wt % of the functionalised polyolefin, wherein the total of all components cannot exceed 100% of the blend.

7. The process of claim 1, wherein the blend comprises at least 75 wt % of a metallocene-produced polyethylene.

8. The process of claim 7, wherein the metallocene-produced polyethylene is produced in the presence of bis (tetrahydroindenyl) or bis(n-butyl-cyclopentadienyl).

9. The process of claim 1, wherein the functionalised polyolefin is a grafted polyethylene or an ionomer or a mixture thereof.

10. The process of claim 1, wherein the blend further comprises a minor component, wherein the minor component is selected from the group consisting of polyetherester, thermoplastic polyurethane and fluoropolymer.

11. The process of claim 10, wherein the minor component is a fluoropolymer, and wherein the fluoropolymer is a copolymer of vinylidene fluoride or a copolymer of vinylidene fluoride and hexafluoropropylene.

12. The process of claim 1, wherein the polyethylene exhibits a melt index ranging from 0.1 to 25 dg/min.

13. The process of claim 1, wherein the polyethylene exhibits a density ranging from 0.910 to 0.975 g/ml.

14. The process of claim 1, wherein the polyethylene exhibits bimodal or multimodal molecular weight distribution.

15. The process of claim 1, wherein the polyethylene exhibits a polydispersity ranging from 2 to 20.

* * * * *